Figure 1:
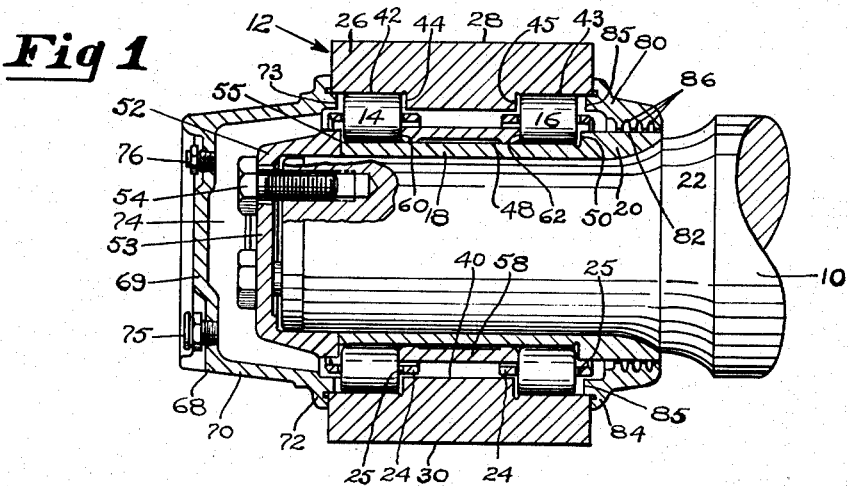

INVENTOR:
RAYMOND H. CRAMER, DECEASED
BY ELEANOR CRAMER AND
RUTH GERTLER, EXECUTORS
BY Edward H. Goodrich
THEIR ATTORNEY.

United States Patent Office 2,901,299
Patented Aug. 25, 1959

2,901,299
JOURNAL BOX

Raymond H. Cramer, deceased, late of Bloomfield, N.J., by Eleanor Cramer, Newark, and Ruth Gertler, Summit, N.J., executrices, assignors to General Motors Corporation, Detroit, Mich., a corporation of Delaware Application April 4, 1956, Serial No. 576,153

6 Claims. (Cl. 308—180)

This invention relates to journal boxes and particularly to an improved railway journal box having antifriction bearings that receive an axle for free rotation.

To provide more efficient operation of a railway train, it is common practice to support railway cars on journal boxes that are mounted on rotatable axles through one or more rows of circumferentially arranged rollers in the presence of a suitable lubricant, the ends of each journal box being closed to retain the lubricant and to exclude dirt and other deleterious material. The car axles are usually permitted to shift endwise in the journal boxes through a limited extent to avoid transmitting objectionable vibration and shocks to the car as well as to aid the car in negotiating curves and uneven portions of track. In such a journal box employing cylindrical rollers, there is an uneven distribution of stress concentrations in the rollers since the ends of these rollers are weakly supported in comparison to the support of the rollers at their intermediate portions. These nonuniform stress distributions coupled with the endwise movements of the rotatable axle tend to impede the free rolling movements of the rollers causing these rollers to skew out of parallel relation to the axis of the axle. The axial misalignment of these rollers produces an objectionable sliding of the rollers causing damaging scuffing of the rollers and raceways and other surfaces engaged by the rollers resulting in detrimental friction as well as heating and wear all of which contributes to much shortened bearing life and sudden bearing failure.

It is, therefore, an object of this invention to provide an improved journal box having antifrictional rolling elements wherein sliding and scuffing movements of the rolling elements is eliminated.

Another object of the invention is to provide an improved journal box for rotatably receiving an axle through rolling elements and wherein the rolling elements do not tend to become misaligned.

A further object resides in the provision of an improved journal box of simple, reliable construction and having a series of axially parallel rolling elements which provide for free rotation of an axle and which limit the extent of endwise axle movement.

Figure 2:
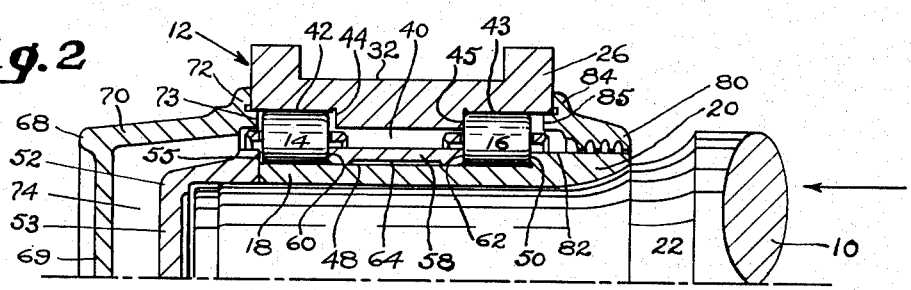
Figure 3:
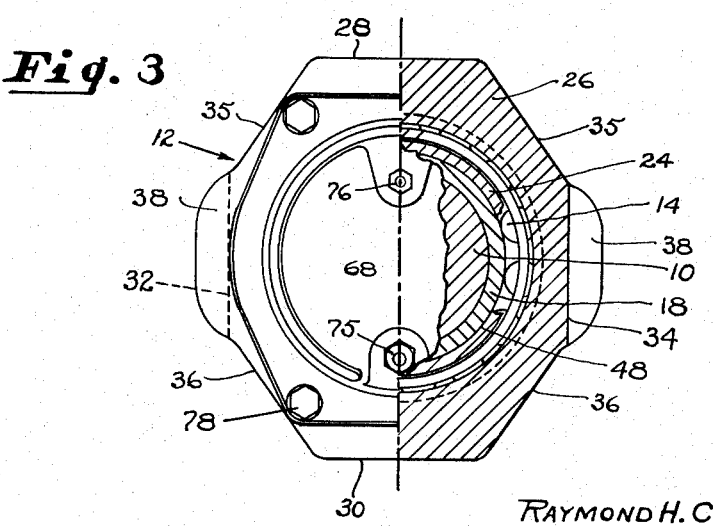

To these ends and also to improve generally upon devices of this character, the invention consists in the various matters hereinafter described and claimed. In its broader aspects, the invention is not necessarily limited to the specific structures selected for illustrative purposes in the accompanying drawings wherein Figure 1 is a fragmentary vertical sectional view through a journal box embodying the invention;

Figure 2 is a fragmentary central horizontal section through the journal box of Figure 1; and Figure 3 is an end view of the journal box partially broken away in vertical cross section.

An axle 10 is antifrictionally supported for rotation in a journal box 12 by two similar rows of bearing rollers 14 and 16, herein shown cylindrical and which are free to roll upon a hardened cylindrical sleeve or race ring 18 pressed over a reduced end of the axle. The inner end of the race ring 18 has an enlarged portion 20 fitting against an enlargement 22 of the axle. The rollers of each row are circumferentially spaced about the race ring 18 by an annular cage 24, these rollers being loosely received within cage pockets 25.

The journal box 12 has a body portion or housing 26 generally hexagonal in cross section and which may comprise a forging or a suitable steel casting. This housing has substantially flat parallel top and bottom walls 28 and 30 and is provided with substantially vertical parallel side walls 32 and 34. The top, bottom and side walls are interconnected by angularly disposed walls 35 and 36. Each side of the housing has a pair of spaced laterally extending guide flanges 38, these guide flanges and housing side walls co-operatively providing vertically disposed open-ended grooves at each side of the housing arranged to slidably receive laterally spaced downwardly extending legs of a truck pedestal (not shown). An upper saddle portion of the truck pedestal may rest on a seat formed by the top face 28 of the housing 26. It will be noted that this housing is symmetrical so that it may be turned through 180° to provide a pedestal mounting face either with the housing wall 28 or 30. This arrangement provides for a replaceable load carrying zone in the housing when a portion of the housing becomes worn by the rolling elements.

The housing 26 has a through bore 40 and is provided at each end with counterbores that form coaxial cylindrical raceways 42 and 43 against which the sets of rolling elements 14 and 16 may roll. The inner end of the raceway 42 terminates in an annular shoulder 44 and the inner end of the raceway 43 terminates in a similar shoulder 45. These annular shoulders 44 and 45 provide abutments engageable with the inner ends of the sets of rollers 14 and 16 and are spaced apart through a lesser distance than the axial spacing between the sets of rollers so that a limited endwise movement of the axle may be provided for with respect to the journal box housing 26. The raceways 42 and 43 and the annular shoulders 44 and 45 associated therewith are preferably heat treated as by an induction hardening operation or other suitable method to provide hard wear resistant surfaces engageable with the rollers. The annular shoulders 44 and 45 may be flat but are preferably slightly frusto conical and converge radially inwardly towards each other through a very slight extent to provide for free entrance of lubricant between the inner ends of the rollers and the adjacent annular shoulders of the housing when the rollers are in thrust engagement with these shoulders.

The inner race ring sleeve 18 has a hardened cylindrical raceway 48 upon which the sets of rollers 14 and 16 are free to roll. The inner end of this raceway 48 terminates in an annular radially disposed shoulder 50 engageable with the ends of the rollers 16. A locking cup 52, having an end wall 53, is slidably fitted over the outer end of the reduced axle portion and in abutting engagement with the outer end of the race ring sleeve 18. Demountable clamping members such as cap screws 54 extend through the end wall 53 and are threaded into the axle to tightly hold the sleeve 18 on the axle and in firmly abutted interfitting engagement with the enlarged axle portion 22. The depth of the cup 52 is such that the end wall 53 is spaced from the end of the axle. An annular shoulder 55 of the cup 52 which abuts against the sleeve 18 extends outwardly from the end of the inner raceway 48 to provide a radially disposed abutting shoulder for engagement with the outer ends of the rollers 14. A freely floating spacing sleeve 58 for locating the rollers axially parallel to the axle is slidably and rotatably journalled upon the inner raceway 48 and has radially disposed end walls 60 and 62 serving to axially space the sets of rollers 14 and 16. The length of the spacing sleeve 58 combined with that of a pair of the rollers 14 and 16 is preferably slightly less than the axial distance between the shoulders 50 and 55 to provide opportunity for maintaining lubricant between the rollers and the adjacent shoulders and to provide for a lubricating film between the sleeve 58 and the raceway 43. The sleeve 58 is also annularly recessed at 64 to provide a well for lubricant.

A front end cap 68 of generally cup-shaped contour has an end wall 69 and a tapering annular wall 70 that terminates in a flange 72 which is demountably seated in sealing engagement against the flat front end wall of the housing 26. This flange has an annular shouldered portion 73 piloted in the raceway 42 and spaced from the annular shoulder 44 through a distance greater than the length of each roller 14. The front end cap is in spaced surrounding relation to the cup 52 to provide a supply chamber 74 for suitable lubricant which may be entered through a fitting 75 in the end wall 69. A relief valve 76 in the upper portion of the end cap 68 prevents the lubricant from building up objectionable pressure within the journal box and leaking out of the rearward end of the box. The end cap 68 may be demountably held in position by suitable bolts or screws as 78.

A rear end cap 80 which is demountably secured to the housing as by bolts or screws, surrounds the enlarged portion 20 of the inner race ring sleeve 18 in slightly spaced relation to its cylindrical outer face 82. This end cap 80 has an annular flange 84 fitting against the rearward end of the housing 26. The flange 84 has an annular shoulder 85 piloted in the raceway 43 and axially spaced from the shoulder 45 a distance exceeding the length of each of the rollers 16. The rearward end of the cap 80 may have a series of retaining grooves 86 in closely surrounding relation to the cylindrical face 82 to prevent lubricant leakage from the rearward end of the journal box. It will be noted that the amount of free end play of the rollers 14 and 16 and spacing sleeve 58 between the annular shoulders 50 and 55 is appreciably less than the amount of free end play of the rollers 14 and 16 between the shoulders 44 and 45 of the housing 26. Also, the spacing between the end cap shoulders 73 and 85 exceeds the axial spacing between the roller-guiding annular shoulders 50 and 55.

During normal operation of the journal box, when a car is running along a substantially straight track, the rollers may assume the positions shown in Figure 1 and lie in spaced relation to the annular shoulders 44 and 45. When the car encounters an uneven portion of track or a curve tending to shift the axle 10 towards the left as indicated in Figure 2, the rollers 16 will be lightly engaged endwise between the radially disposed annular shoulder 50 and the radially disposed annular shoulder 62 of the freely movable spacing sleeve 58. This shoulder guiding engagement of the radially flat ends of rollers 16 against these shoulders usually occurs before the rollers 16 engage the shoulder 45 of the housing 26 thereby positioning the rollers axially parallel to the axle axis. This arrangement assures that the entire set of rollers 16 is located in the desired axially parallel relation and avoids the previously objectionable scuffing and sliding of the rollers against the raceways which has often resulted from the unevenly distributed stress concentrations in the rollers. At this time, the endwise shifting of the axle toward the left will be limited by the endwise engagement of the axially aligned rollers 16 between the shoulders 50 and 45. In view of the fact that the spacing between the end cap shoulders 73 and 85 exceeds the spacing between the race ring shoulder 50 and the cup shoulder 55, the rollers 14 at this time will be located in spaced relation to both shoulders 44 and 73 and no thrust load will be transmitted through the freely floating sleeve 58 and the rollers 14.

Similarly, when the axle 10 shifts in an opposite direction to that indicated by the arrow of Figure 2, the radial cup shoulder 55 and the radial sleeve shoulder 60 will initially engage the ends of the rollers 14 to position them in parallel axial alignment with the axle axis. These rollers 14 will then be end-engaged between the shoulders 55 and 44 to limit the endwise shifting of the axle. At this time, the freely floating sleeve 58 and the rollers 16 will take no thrust load since the rollers 16 will be located in spaced relation to the shoulders 45 and 85.

We claim:

1. In a journal box, a housing for supporting a load and having cylindrical raceways and a pair of spaced annular shoulders, a rotatable axis extending into the housing, a pair of axially spaced circumferentially disposed sets of rollers respectively engageable with the raceways and with said shoulders, said sets of rollers receiving the axle for antifrictional rotation, means on the axle providing a pair of spaced roller-engageable shoulders, the shoulders on the axle and the housing shoulders cooperatively providing for a predetermined extent of endwise axle movement in the housing, an axially shiftable roller-guiding sleeve journalled about the axle between the sets of rollers, said roller-guiding sleeve being engageable with the roller ends to maintain the rollers axially parallel, and said sleeve having a length exceeding the distance between the housing shoulders.

2. In a journal box, a housing for supporting a load and having spaced cylindrical raceways and a pair of spaced annular shoulders respectively located at the inner ends of said raceways, a rotatable axle extending into the housing, a pair of axially spaced circumferentially disposed sets of cylindrical rollers respectively engageable with the raceways and with said shoulders and receiving the axle for antifrictional rotation, the inner ends of each set of rollers having radially disposed flat faces, an axially slidable roller guiding sleeve journalled about the axis between the sets of rollers and having a length exceeding the distance between the housing shoulders, the roller guiding sleeve having radially disposed annular shoulders engageable with the flat roller ends, and shoulder means on the axle respectively engageable with the outer ends of each set of rollers and cooperating with said sleeve shoulders to guide both sets of rollers parallel to the axis of said axle.

3. In a journal box, a housing for supporting a load and having a pair of coaxial cylindrical raceways and an annular shoulder at the inner end of each raceway, a rotatable axle extending into the housing, a pair of axially spaced circumferentially disposed sets of cylindrical rollers respectively engageable with the raceways and with said shoulders, an inner race ring fitted over the axle and rotatably received by the sets of rollers, said rollers having radially disposed flat end faces, the race ring having an annular radially disposed shoulder engageable with the end faces of one set of rollers, a race ring securing member fastened to the axle and having a radially disposed annular shoulder engageable with the outer ends of the other set of rollers, a spacer sleeve slidably and rotatably journalled on the race ring between the sets of rollers and having radially disposed annular shoulders engageable with the flat inner roller ends to position the rollers parallel to the axle axis, and said spacer sleeve having a length exceeding the distance between the housing shoulders.

4. In a journal box, a housing for supporting a load and having a pair of coaxial cylindrical raceways and an annular shoulder at the inner end of each raceway, a pair of circumferentially spaced sets of rollers having radially disposed flat ends and engageable with said raceways, the inner ends of each of the sets of rollers being engageable with said annular shoulders, cap members demountably secured to the ends of the housing and having annular shoulders respectively engageable with the outer ends of said rollers, said end cap shoulders being spaced from the housing shoulders through a distance sufficient to allow an axial endwise movement of each of the sets of rollers, a rotatable axle extending into the housing, an inner race ring fitted over the axle and rotatably received by the sets of rollers, the race ring having an innular shoulder engageable with the outer end faces of one set of said rollers, a race ring securing member mounted on and fastened to the axle in abutting engagement with an end of the race ring and having an annular shoulder engageable with the outer ends of the other set of rollers, and a spacer sleeve slidably and rotatably journalled on the race ring between the sets of rollers and having annular end shoulders engageable with the inner roller ends and spaced apart through a distance exceeding that of the distance between the housing shoulders.

5. In a journal box, a housing for supporting a load and having a pair of coaxial cylindrical raceways and a pair of annularly spaced radially disposed shoulders respectively located at the inner end of each raceway, a pair of axially spaced circumferentially disposed sets of cylindrical rollers respectively engageable with the raceways and with said shoulders, a rotatable axle extending into the housing, an inner race ring fitted over the axle and rotatably received by both sets of rollers, said rollers having radially disposed flat end faces, the inner race ring having an annular radially disposed shoulder engageable with the outer end faces of one set of rollers, a race ring securing member fitted over and secured to the axle in abutting relation with the outer end of the inner race ring and having a radially disposed annular shoulder engageable with the outer ends of the other set of rollers, a spacer sleeve slidably and rotatably journalled on the race ring between the sets of rollers and having radially disposed annular end faces spaced apart through a distance greater than the space between said housing shoulders, an inner end cap secured to the housing in surrounding relation to the inner race ring and having an annular radially disposed roller engageable shoulder in opposing spaced relation to one of said housing shoulders and permitting one of the sets of rollers to axially move within the housing, and a front end cap secured to the housing in closed relation over the end of the axle, said front end cap having an annular radially disposed shoulder engageable with the outer ends of the other set of rollers and spaced in opposing relation to a housing shoulder to permit an axial movement of the outer set of rollers whereby the axle is free to assume a controlled endwise movement during its rotation.

6. In a journal box, a housing having a pair of coaxial cylindrical axially spaced raceways and an annular shoulder at the inner end of each raceway, a pair of spaced circumferentially disposed sets of cylindrical rollers received in said raceways and respectively engageable at their inner ends with said shoulders, a rotatable axle, an inner race ring mounted on the axle and rotatably received by both sets of rollers, said rollers having radially disposed flat end faces, the inner race ring having an annularly extending radially disposed shoulder engageable with the outer ends of one of said sets of rollers, a race ring securing member secured to the axle and having a radially disposed annular shoulder engageable with the outer ends of the other set of rollers, a spacer sleeve rotatably and slidably journalled on the race ring between the sets of rollers and having a length exceeding the distance between said housing shoulders, an end cap secured to the housing in spaced surrounding relation to the inner race ring and having an annular portion fitted within one of the housing raceways and having an annular shoulder engageable with the outer ends of one set of rollers, and a front end cap demountably secured to the housing in closing relation about the end of the axle, said front end cap having an annular projection fitted within said other housing raceway and terminating in a radially disposed shoulder engageable with the outer ends of the other set of rollers, said end cap shoulders being spaced apart through a distance exceeding that of the spacing of the shoulders at the ends of the inner race ring whereby the axle will be free to assume an endwise movement during its rotation through a controlled extent.

References Cited in the file of this patent

UNITED STATES PATENTS

| | | |
|---|---|---|
| 1,200,445 | Laycock | Oct. 3, 1916 |
| 2,597,516 | Noe | May 20, 1952 |
| 2,703,738 | Palmgren et al. | Mar. 8, 1955 |
| 2,802,705 | Halvorsen | Aug. 13, 1957 |

FOREIGN PATENTS

| | | |
|---|---|---|
| 104,637 | Austria | Nov. 10, 1926 |
| 1,073,459 | France | Mar. 24, 1954 |